(12) United States Patent
Hamilton et al.

(10) Patent No.: US 7,830,879 B2
(45) Date of Patent: Nov. 9, 2010

(54) NETWORK-BASED DATA DISTRIBUTION SYSTEM

(75) Inventors: Christopher W. Hamilton, Breinigsville, PA (US); James Mark Sepko, Coplay, PA (US)

(73) Assignee: Agere Systems Inc., Allentown, PA (US)

( * ) Notice: Subject to any disclaimer, the term of this patent is extended or adjusted under 35 U.S.C. 154(b) by 1741 days.

(21) Appl. No.: 10/746,808

(22) Filed: Dec. 24, 2003

(65) Prior Publication Data

US 2005/0141539 A1 Jun. 30, 2005

(51) Int. Cl.
*H04L 12/56* (2006.01)
*H04J 3/26* (2006.01)

(52) U.S. Cl. .................. 370/390; 370/400; 370/432; 370/469

(58) Field of Classification Search .......... 370/392, 370/400, 401, 412, 419, 431, 432, 463–465, 370/468, 469, 473, 390
See application file for complete search history.

(56) References Cited

U.S. PATENT DOCUMENTS

| | | | |
|---|---|---|---|
| 5,754,941 A | | 5/1998 | Sharpe et al. |
| 7,327,989 B2 * | | 2/2008 | Levinberg .................. 455/98 |
| 7,500,261 B1 * | | 3/2009 | Myers ..................... 370/320 |
| 2003/0101426 A1 | | 5/2003 | Sarkinen et al. |
| 2004/0037280 A1 * | | 2/2004 | Hein et al. ................ 370/390 |
| 2004/0081192 A1 * | | 4/2004 | Koulakiotis et al. ........ 370/432 |
| 2004/0202164 A1 * | | 10/2004 | Hooper et al. ............. 370/390 |

FOREIGN PATENT DOCUMENTS

| | | |
|---|---|---|
| EP | 04 25 7906 | 4/2005 |
| WO | WO 02/47428 | 6/2002 |

OTHER PUBLICATIONS

"Data Networks and Open System Communications Open Systems Interconnection—Model and Notation", ITU-T X.200, Jul. 1994.*
Agere Systems, Product Brief, "Edge/Access and Multiservice Network Processors: APP550 and APP530," pp. 1-4, May 2003.
Agere Systems, Advance Product Brief, "MARS2G5T-Pro 16 (TSOT162G5P6)/ MARS2G5TD-Pro16 (TSOT162G5P6D) SONET/SDH STS-48/STM-16 Overhead Terminator/Path Processor," pp. 1-10, Jun. 2003.
Agere Systems, Advance Product Brief, "MARS10G T-Pro (TSOT1610GP)/ MARS10G TD-Pro 16 (TSOT1610GPD) SONET/SDH STS-192/STM-64 Overhead Terminator/Path Processor," pp. 1-10, Jun. 2003.

* cited by examiner

*Primary Examiner*—Aung S Moe
*Assistant Examiner*—Kerri M Rose
(74) *Attorney, Agent, or Firm*—Ryan, Mason & Lewis, LLP

(57) ABSTRACT

A network-based data distribution system includes a physical layer device connectable to a network processor operative in a link layer or higher layer. The physical layer device is configurable for interfacing with a plurality of destination devices via corresponding physical layer links. The physical layer device is operative to receive data traffic from the network processor and to replicate at least a portion of the data traffic at a physical layer for distribution to at least two of the plurality of destination devices associated with the physical layer links.

20 Claims, 2 Drawing Sheets

NETWORK-BASED DATA DISTRIBUTION SYSTEM

FIELD OF THE INVENTION

The present invention relates generally to network-based communication systems, and more particularly to network-based data distribution techniques for replicating data to be distributed to a plurality of destination links at a physical layer.

BACKGROUND OF THE INVENTION

In a standard architecture for network-based data communications, layers typically define hardware and software required for multi-vendor information processing equipment to be mutually compatible. A well-known Open Systems Interconnect (OSI) seven-layer model includes the following hierarchical layers, from lowest to highest: physical, link, network, transport, session, presentation and application. These layers may be referred to as Layer 1 through Layer 7, respectively. In the context of, for example, a synchronous optical network (SONET)/synchronous data hierarchy (SDH) system, video, voice and/or data traffic is generally processed and/or distributed at the link layer (Layer 2) or above, which significantly increases the complexity and/or cost of the system.

Conventionally, network traffic (e.g., voice or data) and video traffic from various inputs are combined into a single data stream by a higher-layer (e.g., Layer 2 and above) processing element (e.g., a network processor) for distribution to multiple destinations. The processing element will generally replicate the video and network traffic at Layer 2 or higher as needed and individually place the replicated traffic on a physical layer (Layer 1) path. In cases where SONET/SDH signals are used to transmit the data, traffic is configured for the individual paths. Therefore, each path will require the same amount of Layer 1 and above resources, even though the data traffic on each of the paths may be substantially the same. This standard methodology thus undesirably consumes system resources, both at the physical layer and at higher layers in order to implement the above functionality.

There exists a need, therefore, for more cost-effective and less complex network-based data distribution techniques that do not suffer from one or more of the problems exhibited by conventional methodologies.

SUMMARY OF THE INVENTION

The present invention meets the above-noted need by providing, in an illustrative embodiment, a mechanism for more efficiently distributing video and/or network traffic through a network-based data distribution system, particularly when the data to be broadcast to multiple destinations is substantially the same. The techniques of the present invention ensure efficient use of higher-layer (e.g., Layer 2 and above) processing elements by performing replication of traffic at the physical layer, thereby minimizing the need to repeatedly process and distribute similar traffic for each destination. Moreover, by performing replication at the physical layer, certain physical layer operations and/or maintenance are available which may advantageously provide faster failover mechanisms, whereby the functions of a primary network system component are assumed by a secondary system component.

In accordance with one aspect of the invention, an apparatus for use in a network-based data distribution system includes a first physical layer device connectable to a network processor operative in a link layer or higher layer. The first physical layer device is configurable for interfacing with a plurality of destination devices via corresponding physical layer links. The first physical layer device is operative to receive data traffic from the network processor and to replicate at least a portion of the data traffic at a physical layer for distribution to at least two of the plurality of destination devices associated with the physical layer links.

In accordance with another aspect of the invention, the apparatus may further include a second physical layer device connectable between the network processor and the first physical layer device, the second physical layer device being configurable for interfacing with at least one destination device. The second physical layer device is operative: (i) to receive a data stream from the network processor, the data stream comprising a first data portion and a second data portion; (ii) to transmit the first data portion to the first physical layer device for replication; and (iii) to transmit the second data portion to the at least one destination device.

These and other features and advantages of the present invention will become apparent from the following detailed description of illustrative embodiments thereof, which is to be read in connection with the accompanying drawings.

DETAILED DESCRIPTION OF THE INVENTION

Figure 1:
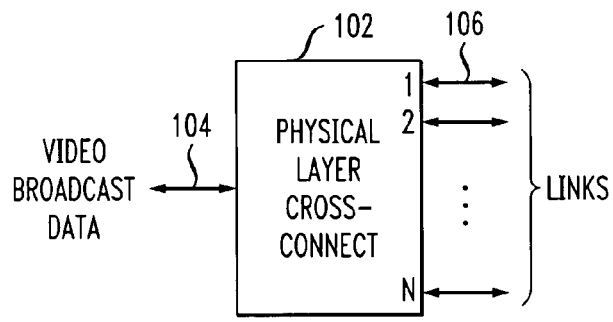
FIG. 1 is a simplified block diagram illustrating an exemplary physical layer device for replicating video broadcast data and distributing the data to multiple links, in accordance with one aspect of the present invention.

The present invention will be described herein in the context of an illustrative network-based data distribution system. It should be understood, however, that the present invention is not limited to this or any particular data distribution system. Rather, the invention is more generally applicable to any system in which it is desirable to provide improved techniques for distributing network-based data to multiple destinations by replicating data traffic at a physical layer, as will be described herein.

The term "broadcast data" as used herein is intended to include, by way of example and without limitation, any data (e.g., broadcast/multicast video) which is to be transmitted to multiple destinations. The term "user-specific data" as used herein is intended to include, by way of example and without limitation, data that is specific to a particular destination. It is to be understood that, in some applications, user-specific data may be intended for distribution to more than one destination. In this instance, such user-specific data may be considered as broadcast data, as defined within the scope of the present invention.

A "link layer device" or LLD as the term is used herein refers generally to a network processor or other type of processor which performs processing operations associated with a link layer of a network-based system. Such a device may be implemented, by way of example and without limitation, utilizing a microprocessor, central processing unit (CPU), digital signal processor (DSP), application-specific integrated circuit (ASIC), or other type of data processing device, as well as portions or combinations of these and other devices. Moreover, the LLD may comprise more than one processing device.

A "physical layer device" or PLD as the term is used herein refers generally to a device which provides an interface between a link layer device (e.g., a network processor) and a physical transmission medium of a network-based system. In the context of, for example, a SONET/SDH system, a suitable physical transmission medium may include, but is not limited to, a synchronous transport signal (STS) link (e.g., STS-1, STS-12, etc.), virtual tributary (VT), etc.

As indicated above, user-specific traffic (e.g., voice or data) and broadcast traffic (e.g., video) from various sources are often combined into a single data stream by a higher-layer (e.g., Layer 2 and above) processing element, such as, for example a network processor, for distribution to various destinations. The network processor will generally replicate the broadcast traffic as needed and individually place the replicated traffic on a physical layer path. This conventional approach is inefficient in that each path will require the same amount of Layer 1 and above resources, even though the data traffic on each of the paths may be substantially the same, thus undesirably consuming system resources, both at the physical layer and at higher layers in order to implement the above functionality.

FIG. 1 depicts a block diagram of an exemplary physical layer device 102 in which the techniques of the present invention are implemented. The physical layer device 102 is preferably configured to receive a broadcast data stream 104 and to replicate at least a portion of the data in the broadcast data stream at a physical layer for transmission to a plurality of destination devices (not shown) via corresponding physical transmission media 106. The destination devices may comprise, for example, one or more line cards coupled to the physical transmission media 106. In the context of a SONET/SDH system, for example, the physical transmission media 106 may comprise one or more STS links, optical carrier (OC) links, etc. Faster SONET transmission rates are defined as STS-n, where n represents a multiple of 51.84 megabits per second (Mb/s), as set forth in the SONET standard for optical telecommunications transport promulgated by the Exchange Carriers Standards Association (ECSA) for the American National Standards Institute (ANSI). It is to be appreciated that the physical layer device 102 may also be configured for receiving data from the physical transmission media 106 and operatively routing such data to a source device via the broadcast data stream 104. The physical layer device 102 is thus preferably configurable for bidirectional data communication.

The exemplary physical layer device 102 may include a cross-connect which functions as a mechanism for performing the replication of data at the physical layer. Alternative switching circuitry (e.g., add/drop multiplexer (ADM), etc.) may also be employed in the physical layer device 102 for replicating the broadcast data at the physical layer, as will be understood by those skilled in the art. In a preferred embodiment of the invention, the physical layer device 102 comprises, for example, a MARS10G T-Pro 16 (TSOT1610GP6) SONET/SDH overhead terminator/path processor, commercially available from Agere Systems Inc. of Allentown, Pa., U.S.A., suitably modified to incorporate physical layer data replication in accordance with the invention.

Figure 2:
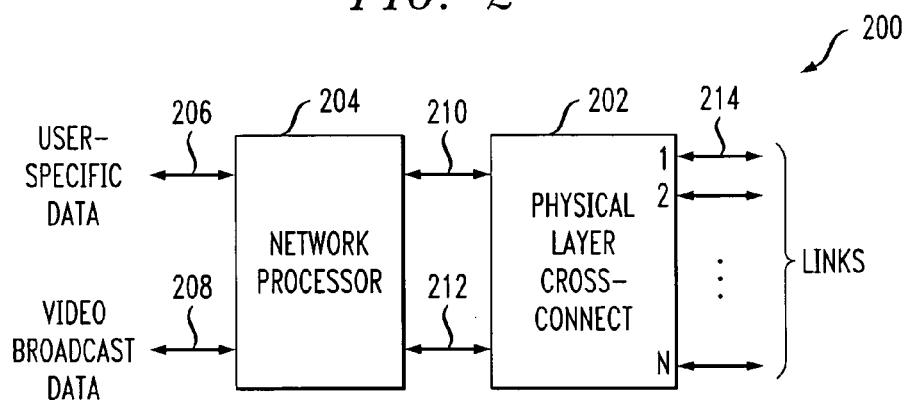
FIG. 2 is a block diagram illustrating at least a portion of an exemplary network-based data distribution system, formed in accordance with one embodiment of the present invention.

FIG. 2 is a block diagram illustrating at least a portion of an exemplary data distribution system 200 in which the techniques of the present invention are implemented. The exemplary data distribution system 200 comprises a network processor 204, or alternative link layer (or higher layer) device, coupled to a physical layer device 202, which may comprise, for example, a physical layer cross-connect. The physical layer device 202 is preferably configured to communicate with a plurality of destination devices (e.g., line cards) via corresponding physical transmission links 214. In a preferred embodiment of the invention, the network processor 204 may comprise an APP550 edge/access network processor, commercially available from Agere Systems Inc., and the physical layer device 202 may comprise the MARS10G T-Pro 16 device previously described, each device being suitably modified to implement data distribution techniques in accordance with the invention.

The network processor 204 preferably receives user-specific data packets 206 and/or broadcast data packets 208 from one or more sources (not shown) via a plurality of corresponding communication channels in a link layer or higher layer. For example, broadcast data 208 may comprise video traffic originating from a digital subscriber line (DSL) service, or alternative broadcast source. The user-specific data 206 may comprise, for instance, voice traffic or network traffic originating from a network server. It is to be appreciated that the network processor 204 may additionally be operative to transmit user-specific and broadcast data to the one or more sources, and may thereby function as a bidirectional device. The network processor 204 is preferably configured for converting received data traffic into a format suitable for use by the physical layer device 202. In a SONET/SDH environment, the network processor 204 maybe configured to format the received data traffic into, for example, corresponding STS envelopes.

The network processor 204 is preferably operative to perform various categories of tasks, including some physical layer functions, switching and fabric control functions, packet processing functions and system control functions. In some cases, packet processing functions may be subdivided into network layer and higher layer packet processing. The physical layer functions may handle the actual signaling over the network media connections, such as, for example, a 100BaseT Ethernet port, an optical fiber connection, etc. These physical layer functions are typically responsible for converting the data packets into digital signals for transmission over the physical transmission media, such as, for example, Ethernet, SONET/SDH, time division multiple access (TDMA), code division multiple access (CDMA), etc. This conversion of data packets into digital signals is often referred to as data framing.

The switching and fabric control functions of the network processor 204 may be responsible for directing traffic inside the network processor device, such as, for example, steering the data from an ingress port to an appropriate egress port toward the correct network. These functions may also handle operations such as, for example, queuing the data in the appropriate order or priority at these ports. Packet processing functions may handle the processing of substantially all network protocols. Thus, a packet containing instructions on allocating a stream for continuous guaranteed delivery would be handled at this level. System control functions preferably handle the management of most other components of the network processor, including, for example, power management, peripheral device control, console port management, etc., as will be known by those skilled in the art.

In accordance with one aspect of the invention, rather than replicating broadcast data, or any data to be transmitted to multiple destinations (e.g., multicast data), at the link layer or higher layer and routing the broadcast data to each destination via a separate high-bandwidth (e.g., 500 Mb/s) physical transmission link for each destination, the network processor 204, according to the present invention, is operative to identify broadcast data, or other data to be multicast, from the received data traffic and to allocate a separate transmission channel 212 for sending the broadcast traffic to the physical layer device 202 for further processing (e.g., replication). For user-specific data traffic, which generally requires a significantly smaller bandwidth (e.g., less than 50 Mb/s) compared to broadcast data traffic, the network processor 204 is preferably further operative to allocate separate corresponding transmission channels 210 for the user-specific traffic, as may be done in a conventional manner. Thus, the broadcast traffic received by the network processor 204 is preferably handled using a single high-bandwidth transmission channel regardless of the number of destinations to which the broadcast data is to be transmitted. In this manner, the amount of resources utilized by the data distribution system, particularly at Layer 2 and above, can be advantageously reduced.

It is to be understood that although the techniques of the present invention provide a significant reduction in system resources when the broadcast data to be replicated comprises relatively high bandwidth signals (e.g., video data, etc.), the present invention, by performing data replication at the physical layer, provides a beneficial reduction in system overhead even when the data to be replicated comprises signals requiring a relatively low bandwidth (e.g., voice data, etc.). In a SONET/SDH environment, for example, by enabling broadcast/multicast at the physical layer, the techniques of the present invention provide a more cost effective data distribution solution compared to standard data distribution approaches. Moreover, physical layer operations and maintenance, among other important functions, can be enabled, which provide faster failover mechanisms compared to link layer or higher layer implementations, as previously explained.

By way of example only, in a SONET/SDH environment, a given transmission channel may comprise one or more STS-1 links, with each STS-1 link supporting a data transmission rate of about 52 Mb/s. Thus, in order to provide a transmission bandwidth of, for instance, 500 Mb/s, as may be required for video traffic, ten STS-1 links may be concatenated to form a single 500 Mb/s channel. For certain user-specific data, as well as other relatively low bandwidth traffic (e.g., voice data), the 52 Mb/s bandwidth provided by an STS-1 link may be too high. Consequently, in order to provide more granularity, and thus provide a more efficient allocation of transmission bandwidth, the STS-1 links allocated for user-specific data are preferably segmented into smaller components or structures known as virtual tributaries (VTs), for the purpose of transporting and switching payloads smaller than the STS-1 rate. For example, a given 50 Mb/s STS-1 link can be divided into a plurality of VT-1.5 (1.5 Mb/s) links, VT-2 (2 Mb/s) links, VT-6 (6 Mb/s) links, etc., or a suitable combination of such links.

Figure 3:
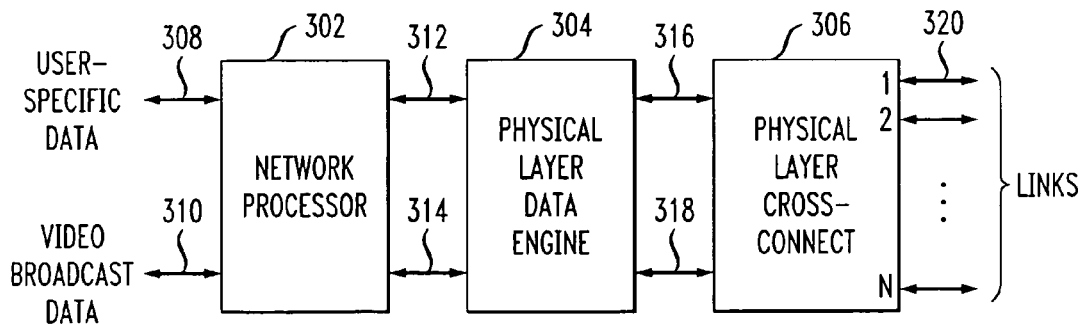
FIG. 3 is a block diagram depicting at least a portion of an exemplary data distribution system, formed in accordance with another embodiment of the present invention.

FIG. 3 depicts an exemplary data distribution system 300 formed in accordance with another aspect of the invention. Like the exemplary data distribution system 200 shown in FIG. 2, the data distribution system 300 includes a network processor 302, configurable for receiving user-specific data traffic 308 and broadcast data traffic 310 from one or more data sources (not shown), and a first physical layer device 306, configured to communicate with a plurality of destination devices via corresponding physical transmission links 320. Like the physical layer device 202 shown in FIG. 2, the first physical layer device 306 is preferably configured to perform replication functions, and may thus comprise a cross-connect, add/drop multiplexer, or alternative switching circuitry.

The data distribution system 300 further includes a second physical layer device 304 connected between the network processor 302 and the first physical layer device 306. The second physical layer device 304 preferably functions as a data engine for performing certain tasks which may reduce the processing burden on the first physical layer device 306. For example, the second physical layer device 304 may operatively convert the data received from the network processor 302 in a first format into at least a second format for use by the first physical layer device 306 (e.g., data framing). In a preferred embodiment of the invention, the second physical layer device 304 may comprise, for example, a MARS2G5 P-Max LT 16 (TSDE162G52) SONET/SDH overhead terminator/path processor commercially available from Agere Systems Inc.

As previously stated, the network processor 302 is preferably configured to identify broadcast data traffic, or other data traffic to be replicated, and allocate a separate transmission channel 314 through which the broadcast data is transmitted. User-specific data traffic, which does not require replication, is preferably identified by the network processor 302 and allocated to one or more channels 312 corresponding thereto through which the user-specific data is transmitted. Alternatively, the broadcast data channel 314 and the user-specific data channel 312 may be combined to form a single data stream of suitable bandwidth to handle both the broadcast data traffic and user-specific data traffic. The second physical layer device 304 may be operative to identify the user-specific data received from the network processor 302 and configure the data into a format (e.g., STS envelope) suitable for use by the intended destination device. Therefore, the user-specific data transmitted to the first physical layer device 306 from the second physical layer device 304 may be simply routed through to the corresponding physical transmission links 320 without replication by the first physical layer device.

In the context of a SONET/SDH system, the network processor 302 may transmit the broadcast data and/or user-specific data to the second physical layer device 304 using, for example, a Universal Test and Operations Physical-Layer (PHY) Interface for Asynchronous Transfer Mode (UTOPIA) bus. The UTOPIA interface, which is based on the ATM (asynchronous transfer mode) Forum standards (e.g., "UTOPIA, An ATM-PHY Interface Specification," Level 1, Version 2.01, af-phy-0017.000, March 1994, "UTOPIA, An ATM-PHY Interface Specification," Level 2, Version 1.0, af-phy-0039.000, June 1995, "UTOPIA Level 3," af-phy-0136.000, November 1999, and "UTOPIA Level 4," af-phy-0144.001, March 2000, all of which are incorporated by reference herein), has been specifically defined to handle ATM cell-based traffic. Alternative interfaces between the network processor 302 and the second physical layer device 304, such as, for example, System Packet Interface (SPI), Packet-over-SONET/SDH (POS), etc., are similarly contemplated by the invention.

The second physical layer device 304 is preferably operative to convert the broadcast data traffic and user-specific data traffic received from the network processor 302 via transmission channels 314 and 312, respectively, to a format suitable for use by the first physical layer device 306. By way of example only, the second physical layer device 304 may be configurable for converting the broadcast traffic and user-specific traffic received from the network processor 302 via the UTOPIA interface into corresponding synchronous transfer mode (STM) signals. The broadcast and user-specific STM signals may then be transmitted to the first physical layer device 306 via corresponding data transmission channels 318 and 316, respectively. The first physical layer device 306 is preferably configured for replicating broadcast/multicast data traffic for transmission to one or more destination devices (not shown) via the corresponding physical transmission links 320. The replication of broadcast/multicast traffic is performed at the physical layer, thereby beneficially conserving Layer 2 and higher layer resources.

As an illustration of the beneficial reduction in processing overhead at Layer 2 and above provided by the techniques of the present invention, consider an illustrative scenario in which 1.1 Gigabits per second (Gb/s) of broadcast traffic is to be sent to 10 destinations using a conventional data distribution system. The total outbound bandwidth required at Layer 1 and above is 11 Gb/s (e.g., 10×1.1 Gb/s). If only 100 Mb/s of user-specific traffic is required per destination, then only 1 Gb/s of bandwidth is needed (e.g., 10×100 Mb/s) at Layer 1 and above. It is to be appreciated that the 1.1 Gb/s bandwidth of the broadcast traffic sent to each destination is merely exemplary, and that the bandwidth of the broadcast traffic may be greater than or less than 1.1 Gb/s.

Using the methodologies of the present invention set forth herein, while the Layer 1 bandwidth required to distribute the broadcast traffic would still be 11 Gb/s, the total outbound bandwidth required at Layer 2 and above is only 1.1 Gb/s, since replication of the broadcast traffic is performed by the physical layer device at Layer 1. For the user-specific traffic, the same amount of bandwidth, namely, 1 Gb/s, would be required at Layer 1 and above. However, since the user-specific traffic is typically of substantially smaller bandwidth compared to the broadcast traffic, such user-specific traffic represents only a relatively small percentage of the total Layer 1 bandwidth requirement.

As demonstrated by the above illustration, using the techniques of the present invention, the amount of processing bandwidth required at Layer 2 and above has been reduced by about 10 Gb/s. The beneficial reduction in processing overhead at Layer 2 and above provided by the present invention is even more significant as the number of destinations to which the broadcast data is to be transmitted increases and/or the amount of bandwidth required by the broadcast data increases.

Figure 4:
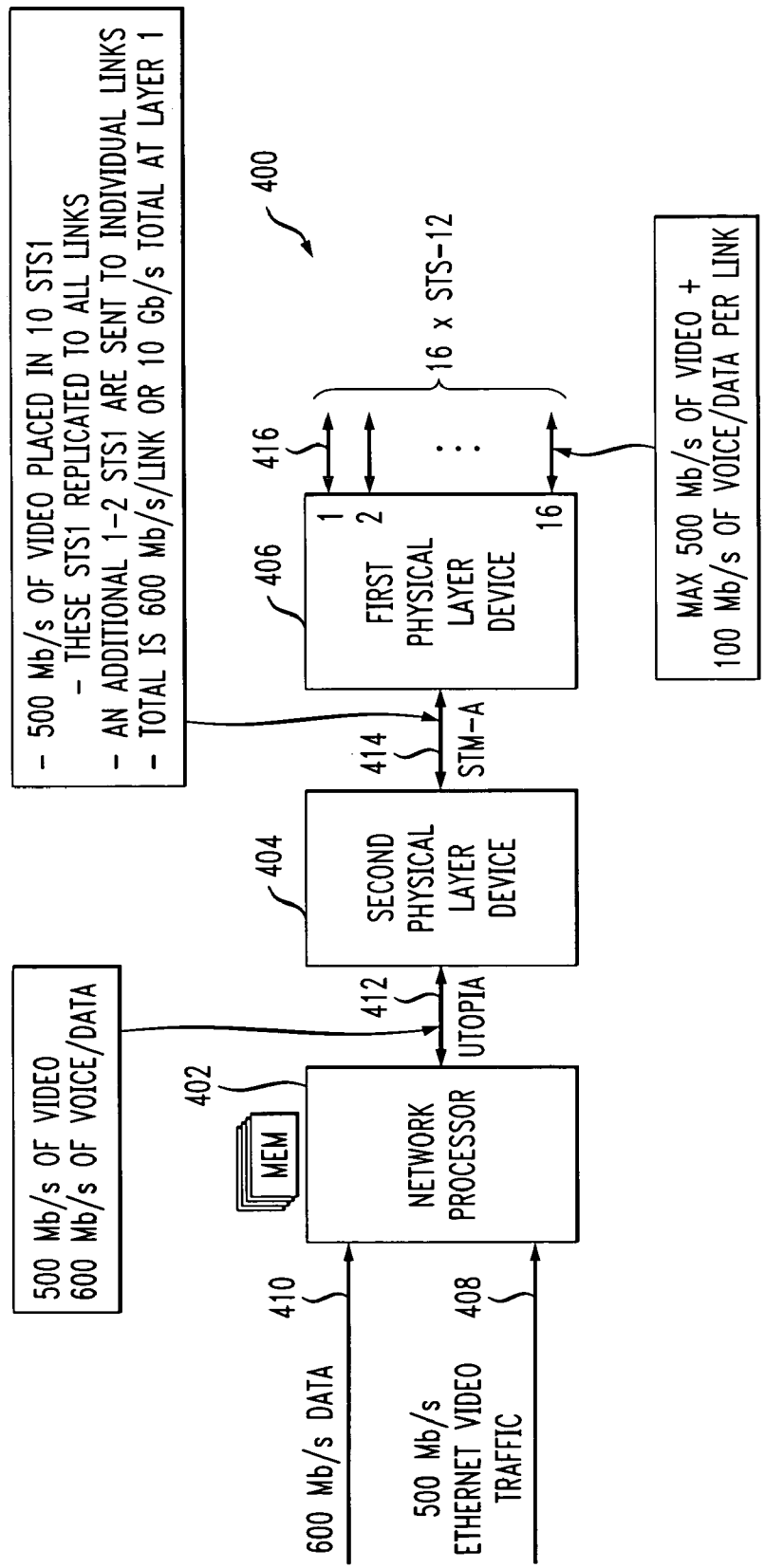
FIG. 4 is a block diagram depicting at least a portion of an illustrative SONET/SDH digital subscriber line access multiplexer (DSLAM) system in which the techniques of the present invention are implemented.

By way of example only, FIG. 4 is a block diagram depicting at least a portion of an illustrative SONET/SDH digital subscriber line access multiplexer (DSLAM) system 400 in which the techniques of the present invention are implemented. The illustrative DSLAM system 400 includes a Layer 2 or higher layer network processor 402, which may comprise an Agere Systems APP550, a first physical layer device 406, which may comprise an Agere Systems MARS10G T-Pro 16SONET/SDH STS-192/STM-64 overhead terminator/path processor, and a second physical layer device 404, which may comprise an Agere Systems MARS2G5 P-Max LT SONET/SDH STS-48/STM-16 overhead terminator/path processor.

The network processor 402 is preferably configured to receive broadcast data 408, which may comprise, for example, 500 Mb/s of ethernet video traffic. The network processor 402 may also receive user-specific data 410 (e.g., intended for a particular destination device), which may comprise, for example, 600 Mb/s of voice/data traffic. Network processor 402 is further preferably operative to combine the broadcast traffic and user-specific traffic for transmission to the second physical layer device 404 via a UTOPIA interface 412, although alternative interfaces and/or communication protocols may be similarly employed (e.g., Gigabit Media Independent Interface (GMII), POS, etc.).

The second physical layer device 404 is configured to receive the broadcast and user-specific traffic from the network processor 402 via the UTOPIA interface 412 and configure the data traffic into corresponding STM envelopes. The STM signals are then transmitted to the first physical later device 406 via an STM transmission channel 414. The first physical layer device 406 is configured to receive the STM signals from the second physical layer device 404 via the STM channel 414 and perform replication and/or routing of the received data at Layer 1 to one or more destination devices (not shown) via corresponding physical transmission links 416. Other functions performed by the first and/or second physical layer devices may include, but are not limited to, path termination, line maintenance, etc. It is to be understood that although the illustrative DSLAM system 400 has been described in connection with the distribution of data from the network processor to the physical transmission links 416 (e.g., STS-12 links), the system may also be configured to receive data from the physical transmission links 416 and transmit the data to the network processor 402. Thus, the data distribution system 400 may be configurable for bidirectional operation.

In the illustrative DSLAM system 400, assume that 500 Mb/s of video data is to be transmitted to 16 line cards along with a maximum of 100 Mb/s of user-specific data associated with each of the line cards over corresponding STS-12 links 416. Conventionally, data replication is performed at Layer 2 or higher. Accordingly, about 8 Gb/s of outbound processing bandwidth is required for the video data traffic (e.g., 16×500 Mb/s) and about 1.6 Gb/s of processing bandwidth is required for the user-specific data traffic (e.g., 16×100 Mb/s) for a total of about 10 Gb/s of bandwidth required at Layer 1 and above. By contrast, using the illustrative DSLAM system 400, less than 2 Gb/s of total outbound processing bandwidth is required at Layer 2 and above, since replication of the video data traffic is performed at Layer 1.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. An apparatus, comprising:
   at least one link layer device operative: to receive data via a network, the data comprising broadcast data and user-specific data; and to allocate a separate transmission channel to one or more physical layer devices for at least a portion of the broadcast data;
   wherein at least one of the one or more physical layer devices is operative to replicate at least a portion of the broadcast data.

2. The apparatus of claim 1, wherein the at least one link layer device is further operative to differentiate between the broadcast data and the user-specific data.

3. The apparatus of claim 1, wherein the at least one link layer device is further operative to allocate separate corresponding transmission channels for at least a subset of the user-specific data.

4. The apparatus of claim 3, wherein the transmission channel allocated for the broadcast data has a higher bandwidth than the transmission channels allocated for the user-specific data.

5. The apparatus of claim 1, wherein the at least one of the one or more physical layer devices is further operative to receive data from the link layer device and to transmit at least a portion of the data from the link layer device to at least a subset of a plurality of destination devices via corresponding physical transmission links.

6. The apparatus of claim 1, wherein the one or more physical layer devices comprises at least a first physical layer device operative to receive data from the link layer device and to transmit at least a portion of the data received from the link layer device to at least a second physical layer device and wherein the at least second physical layer device is operative to transmit at least a portion of the data from the link layer device to at least a subset of a plurality of destination devices via corresponding physical transmission links.

7. The apparatus of claim 6, wherein the first physical layer device is operative to differentiate between the broadcast data and the user-specific data.

8. The apparatus of claim 6, wherein the second physical layer device is operative to replicate at least a portion of the broadcast data.

9. An apparatus, comprising:
at least one physical layer device operative: to receive data from at least one link layer device, the data comprising broadcast data and user-specific data; to differentiate between the broadcast data and the user-specific data; and to allocate a separate transmission channel for at least a portion of the broadcast data;
wherein the at least one physical layer device is further operative to replicate at least a portion of the broadcast data.

10. The apparatus of claim 9, wherein the at least one physical layer device is further operative to transmit at least a portion of the data from the network to at least a subset of a plurality of destination devices via corresponding physical transmission links.

11. The apparatus of claim 9, wherein the at least one physical layer device is further operative to transmit at least a portion of the received data to at least a second physical layer device and wherein the second physical layer device is operative to transmit at least a portion of the data from the network to at least a subset of a plurality of destination devices via corresponding physical transmission links.

12. An apparatus, comprising:
at least one physical layer device operative: to receive data from at least one link layer device, the data comprising broadcast data and user-specific data; to differentiate between the broadcast data and the user-specific data; and to allocate a separate transmission channel for at least a portion of the broadcast data;
wherein the at least one physical layer device is further operative to transmit at least a portion of the received data to at least a second physical layer device and wherein the second physical layer device is operative to transmit at least a portion of the data from the network to at least a subset of a plurality of destination devices via corresponding physical transmission links;
wherein the second physical layer device is further operative to replicate at least a portion of the broadcast data.

13. A network-based data distribution system, comprising:
one or more physical layer devices; and
at least one link layer device operatively coupled to the one or more physical layer devices;
wherein the at least one link layer device is operative: to receive data via a network, the data comprising broadcast data and user-specific data; to allocate a separate transmission channel for at least a portion of the broadcast data; and to transmit the data to the one or more physical layer devices;
wherein at least one of the one or more physical layer devices is operative to receive data from the link layer device and wherein at least one of the one or more physical layer devices is operative to transmit at least a portion of the data from the link layer device to at least a subset of a plurality of destination devices via corresponding physical transmission links; and
wherein at least one of the one or more physical layer devices is operative to replicate at least a portion of the broadcast data.

14. A method for distributing data traffic to a plurality of destination devices in a network-based data distribution system, the method comprising the steps of:
receiving, in at least one link layer device operatively coupled to one or more physical layer devices, network data comprising broadcast data and user-specific data;
allocating, in the link layer device, a separate transmission channel for at least a portion of the broadcast data;
receiving, in at least one of the one or more physical layer devices, data from the link layer device;
replicating, in at least one of the one or more physical layer devices, at least a portion of the broadcast data received from the link layer device;
wherein at least one of the one or more physical layer devices are operative to transmit at least a portion of the data from the link layer device to at least a subset of a plurality of destination devices via corresponding physical transmission links.

15. The method of claim 14, further comprising the step of allocating, in the link layer device, separate corresponding transmission channels for at least a subset of the user-specific data.

16. The method of claim 14, further comprising the step of differentiating, in the link layer device, between broadcast data and user-specific data.

17. The method of claim 14, wherein a first one of the one or more physical layer devices is operative to receive data from the link layer device and to transmit at least a portion of the data received from the link layer device to at least a second one of the one or more physical layer devices, and wherein the at least second one of the one or more physical layer devices is operative to transmit at least a portion of the data from the link layer device to at least a subset of a plurality of destination devices via corresponding physical transmission links.

18. A method for distributing data traffic to a plurality of destination devices in a network-based data distribution system, the method comprising the steps of:
receiving, in at least one link layer device operatively coupled to one or more physical layer devices, network data comprising broadcast data and user-specific data;
allocating, in the link layer device, a separate transmission channel for at least a portion of the broadcast data; and
receiving, in at least one of the one or more physical layer devices, data from the link layer device;
wherein at least one of the one or more physical layer devices are operative to transmit at least a portion of the data from the link layer device to at least a subset of a plurality of destination devices via corresponding physical transmission links; and wherein a single channel is allocated for the broadcast data regardless of the subset of the plurality of destination devices to which the broadcast data is to be transmitted.

19. An apparatus, comprising:

at least one link layer device operative: to receive data via a network, the data comprising broadcast data and user-specific data; and to allocate a separate transmission channel to one or more physical layer devices for at least a portion of the broadcast data;

wherein at least one of the one or more physical layer devices is operative to receive data from the link layer device and wherein at least one of the one or more physical layer devices is operative to transmit at least a portion of the data from the link layer device to at least a subset of a plurality of destination devices via corresponding physical transmission links; and wherein the at least one link layer device allocates a single channel for the broadcast data regardless of the subset of the plurality of destination devices to which the broadcast data is to be transmitted.

20. A network-based data distribution system, comprising:

one or more physical layer devices; and at least one link layer device operatively coupled to the one or more physical layer devices;

wherein the at least one link layer device is operative: to receive data via a network, the data comprising broadcast data and user-specific data; to allocate a separate transmission channel for at least a portion of the broadcast data; and to transmit the data to the one or more physical layer devices;

wherein at least one of the one or more physical layer devices is operative to receive data from the link layer device and wherein at least one of the one or more physical layer devices is operative to transmit at least a portion of the data from the link layer device to at least a subset of a plurality of destination devices via corresponding physical transmission links; and wherein the at least one link layer device allocates a single channel for the broadcast data regardless of the subset of the plurality of destination devices to which the broadcast data is to be transmitted.

\* \* \* \* \*